United States Patent
Easton

(10) Patent No.: US 6,546,824 B2
(45) Date of Patent: Apr. 15, 2003

(54) SENSOR MOUNTING ASSEMBLY

(75) Inventor: David Joseph Easton, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 62 days.

(21) Appl. No.: 09/930,936

(22) Filed: Aug. 16, 2001

(65) Prior Publication Data

US 2003/0033897 A1 Feb. 20, 2003

(51) Int. Cl.$^7$ ............................. G01M 19/00; G01P 1/02
(52) U.S. Cl. .......................................... 73/866.5; 73/493
(58) Field of Search ............................. 73/866.5, 493, 73/494

(56) References Cited

U.S. PATENT DOCUMENTS

| | | | | |
|---|---|---|---|---|
| 2,508,603 | A | * 5/1950 | Smith | 235/453 |
| 5,067,350 | A | * 11/1991 | Grillo et al. | 73/494 |
| 5,263,900 | A | * 11/1993 | Stimson | 188/181 R |
| 5,581,179 | A | * 12/1996 | Engel et al. | 324/207.2 |
| 5,747,987 | A | * 5/1998 | Smith | 73/493 X |
| 5,801,301 | A | * 9/1998 | Jeong | 73/493 X |
| 5,922,949 | A | * 7/1999 | Nakajima | 73/146.5 |
| 6,222,191 | B1 | * 4/2001 | Myron et al. | 250/353 |
| 6,419,178 | B1 | * 7/2002 | Kohlndolfer et al. | 242/379.1 |
| 6,422,075 | B1 | * 7/2002 | Foster et al. | 73/494 |
| 2002/0125882 | A1 | * 9/2002 | Foster et al. | 324/174 |

FOREIGN PATENT DOCUMENTS

JP          2000-38908          * 2/2000 ............. F01L/1/34

OTHER PUBLICATIONS

John Deere; "Tests and Adjustments–Steering Motor Sensor Adjustment"; p. 260–15–21 (1 page) Jun. 1999.

* cited by examiner

Primary Examiner—Thomas P. Noland

(57) ABSTRACT

A sensor mounting assembly includes a housing having a sensor bore formed therein. An annular groove is formed in a surface of the sensor bore. A retainer is mountable in the sensor bore. The retainer has a C-shaped body and an end of the body has a lip projecting radially outwardly therefrom. A plurality of spaced apart fingers extend axially away from the C-shaped body and away from the lip. Each finger has a plurality of retainer teeth formed thereon. The lip is received by the groove as the retainer is moved axially into the sensor bore. The sensor has a cylindrical sensor body on which are formed teeth for interlocking with the finger teeth. The sensor body is inserted into the retainer when the retainer is mounted in the sensor bore, and the sensor body engages the retainer body to hold the lip within the groove, and the sensor teeth interlock with the retainer teeth to releasable hold the sensor in a mounted position within the retainer and within the sensor bore.

10 Claims, 2 Drawing Sheets

SENSOR MOUNTING ASSEMBLY

BACKGROUND OF THE INVENTION

The present invention relates to a sensor mounting assembly.

There are known commercially available sensors, such as a speed sensor for mounting in a housing adjacent to a rotating speed ring which has alternately oriented magnets arranged around the periphery of the ring. One such known sensor is installed in a hydrostatic motor by screwing the sensor into a threaded bore in a housing until the end of the sensor engages the speed ring. This typically requires 7 to 10 revolutions of the sensor. Then the sensor is backed out of the bore part of a revolution until there exists a desired clearance between the end of the sensor and the speed ring. Such a sensor must also be properly oriented or aligned in order to operate properly. This is done by using one wrench to hold the sensor in proper orientation, and by using a second wrench to tighten a jam nut to fix the sensor in this desired position. This process is difficult to perform when the sensor or sensed device is to be serviced, and is very difficult to perform when the motor is to be serviced on a vehicle, such as a tractor. For example, there may not be access for two wrenches, it may be difficult to rotationally position the sensor accurately, and the polarity of the output signal may be unknown until the speed ring is rotated.

SUMMARY

Accordingly, an object of this invention is to provide a sensor mounting assembly which is simple to mount.

A further object of the invention is to provide such a sensor mounting assembly which can be used to reliably position a sensor, both axially and in rotational orientation.

These and other objects are achieved by the present invention wherein a sensor mounting assembly includes a housing having a sensor bore formed therein. An annular groove is formed in a surface of the sensor bore. A retainer is mountable in the sensor bore. The retainer has a C-shaped body and an end of the body has a lip projecting radially outwardly therefrom. A plurality of spaced apart fingers extend axially away from the C-shaped body and away from the lip. Each finger has a plurality of retainer teeth formed thereon. The lip is received by the groove as the retainer is moved axially into the sensor bore. The sensor has a cylindrical sensor body on which sets of teeth are formed in the spaces between ridges which extend axially along the outer surface of the sensor body. The sensor body is inserted into the retainer when the retainer is mounted in the sensor bore, and the sensor body engages the retainer body to hold the lip within the groove, and the sensor teeth interlock with the retainer teeth to releasably hold the sensor in a mounted position within the retainer and within the sensor bore.

DETAILED DESCRIPTION

Figure 1:
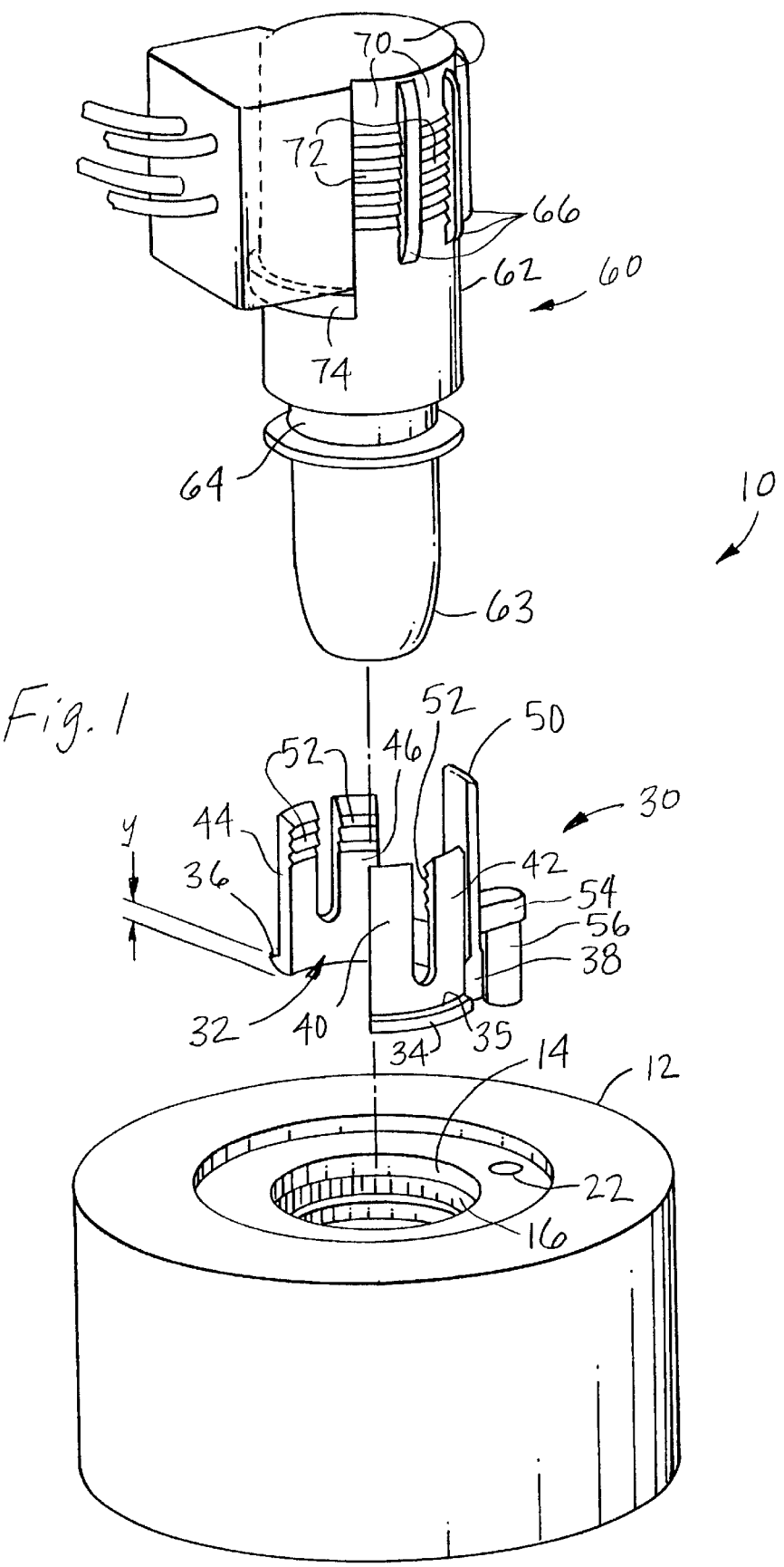
FIG. 1 is an exploded perspective view of a sensor mounting assembly according to the present invention.
Figure 2:
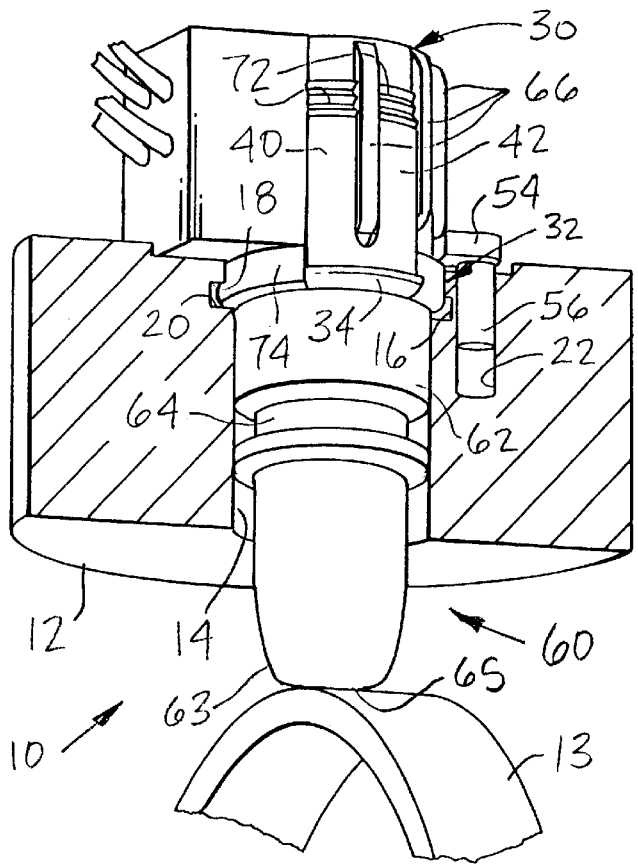
FIG. 2 is a perspective, partial sectional view of a sensor mounting assembly according to the present invention.
Figure 3:
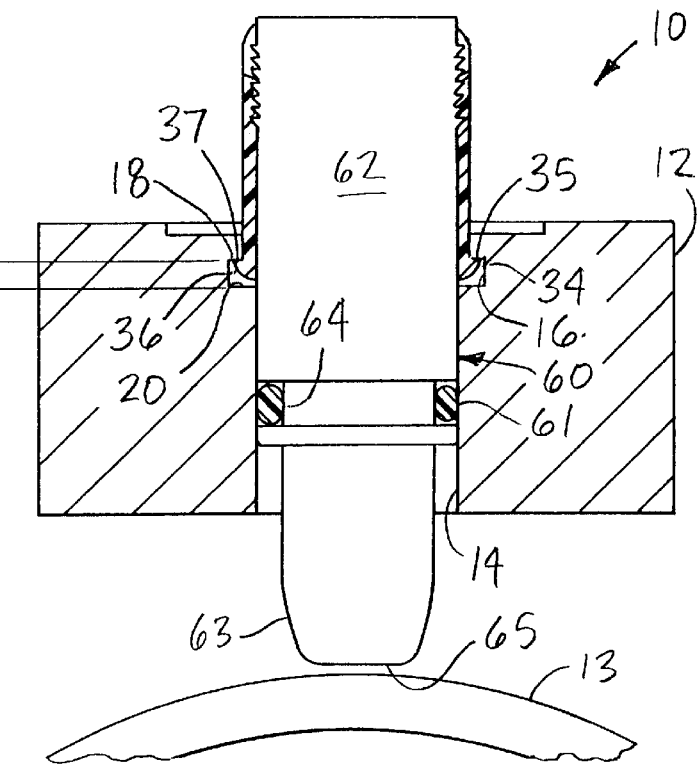
FIG. 3 is partial sectional view of a sensor and retainer mounted in a housing according to the present invention.

Referring to FIGS. 1–3, a sensor mounting assembly 10 includes a housing 12 mounted near to a member to be sensed, such as a rotating wheel, gear or speed ring 13. The housing 12 has a sensor bore 14 extending therethrough, and an annular groove 16 formed in a surface of the bore 14. Preferably, the groove 16 has axially facing and radially extending side walls 18 and 20 which are separated by distance X. A blind alignment bore 22 extends parallel to bore 14 and is spaced apart from bore 14.

A retainer 30 is mountable in the sensor bore 14. The retainer has a C-shaped body 32, and one end of the body 32 has a lip segments 34 and 36 projecting radially outwardly therefrom and spaced apart on either side of a central portion 38 of the body 32. The lips 34, 36 have an axial length Y and define axially facing surfaces 35 and 37. The retainer 30 also has a first set of fingers 40 and 42 adjacent to the lip segment 34 which extend axially away from the lip segment 34. The retainer 30 also has a second set of fingers 44 and 46 adjacent to the lip segment 36 which extending axially away from the lip segment 36.

An alignment tab 50 is positioned between fingers 42 and 46 and extends axially away from the central portion 38. A set of radially inwardly projecting retainer teeth 52 are formed on a distal end of each finger 40, 42, 44 and 46. The retainer 30 also includes an arm 54 which projects radially outwardly from the central portion 38 of the body 32. An alignment pin 56 extends axially from an end of the arm 54. Preferably, in a relaxed state, the outer peripheral surface of the lips 34,36 will be separated by a distance which is larger than the diameter of the bore 14.

A sensor 60, such as a commercially available magnetic speed sensor, includes a cylindrical sensor body 62 in which is formed an annular O-ring groove 64 which receives an O-ring 61. A sensor probe 63 projects from the body 62 and extends to an end 65 close to the speed ring 13. The sensor body 62 has a plurality of axially extending ridges 66 formed on an outer surface thereof and separated by spaces 70 therebetween. A plurality of sets of sensor teeth 72 are formed on the surface of the sensor body 62 in the spaces between the ridges 66, although only two of the four sets of sensor teeth 72 are visible in FIGS. 1 and 2. Preferably, there is a set of sensor teeth 72 corresponding to each set of retainer teeth 52. As best seen in FIGS. 1 and 2, the sensor body 62 has an arcuate shaped ring segment 74 which projects radially from the body 62 and which is dimensioned so as to fit between and substantially fill the space between lip segments 34 and 36 of retainer 30.

To install the sensor 60 in the housing 12, first the retainer 30 is inserted into the bore 14 with the pin 56 aligned with bore 22 and with the lip segments 34 and 36 oriented towards the bore 14. This can be done by manually compressing the lip ends of the fingers 40–46 together so that the retainer 30 can be inserted into the bore 14. Preferably, the lip segments 34 and 36 will depress radially inwardly as they engage the wall of bore 14, and then snap radially outwardly into the groove 16, and the pin 54 will be received by alignment bore 22.

Next, the sensor 60 is inserted into the mounted retainer 30 so that ring segment 74 is positioned between lip segments 34 and 36. The body 62 of sensor 60 holds the lips 34, 36 in the groove 16 and prevents withdrawal of the retainer 30 from the housing 12. The fingers 52 are received by the spaces 70 between the ridges 66 as the sensor 60 slides into the retainer 30 until an end 65 of probe 63 contacts speed ring 13. At this point, the teeth 52 of fingers 40–46 interlock with the teeth 72 to hold the sensor 60 in its mounted position. Air or hydraulic pressure within the assembly, or a mounting spring (not shown) then moves the assembled retainer 30 and sensor 60 away from speed ring so that an axially facing shoulder surface of the lips 34, 36 engages with the annular wall 18 of the groove 16. The resulting clearance between the end of probe 63 and the speed ring 13 will be between a minimum equal to (X-Y) and a maximum of (X-Y plus the pitch distance of the teeth 52 and 72).

To remove the sensor 60, the retainer teeth 52 are disengaged from the sensor teeth 72, thus allowing the sensor to be withdrawn from the retainer 30.

While the present invention has been described in conjunction with a specific embodiment, it is understood that many alternatives, modifications and variations will be apparent to those skilled in the art in light of the foregoing description. For example, this concept can be applied to other similar sensors, such as engine speed sensors, timing sensors, reverse gear sensors, or any sensor which is installed in a housing and which must be spaced a certain distance from another device. Accordingly, this invention is intended to embrace all such alternatives, modifications and variations which fall within the spirit and scope of the appended claims.

I claim:

1. A sensor mounting assembly comprising:

a housing having a sensor bore extending therethrough and the housing having an annular groove formed in a surface of the sensor bore;

a retainer for mounting in the sensor bore, the retainer having an at least partially cylindrical retainer body, one end of the retainer body having a lip projecting radially outwardly therefrom, the retainer including a plurality of fingers extending axially away from the lip to a distal end, and each finger having a plurality of retainer teeth projecting radially inwardly from the distal end, the lip being received by the groove as the retainer is moved axially into the sensor bore; and a sensor having a cylindrical sensor body, the sensor body having a portion on which a plurality of sensor teeth are formed, the sensor body being insertable into the retainer when the retainer is mounted in the sensor bore, the sensor body being engageable with said one end of the retainer body to hold the lip within the groove, and the sensor teeth interlocking with the retainer teeth to releasably hold the sensor in a mounted position within the retainer and within the sensor bore.

2. The sensor mounting assembly of claim 1, wherein:

the housing includes an alignment bore adjacent to and spaced apart from the sensor bore; and the retainer comprises a pin which is received by the alignment bore.

3. The sensor mounting assembly of claim 2, wherein:

the retainer comprises an arm which connects the pin to the retainer body.

4. The sensor mounting assembly of claim 1, wherein:

the lip forms an axially facing shoulder surface for engaging an axially facing annular wall of the groove.

5. The sensor mounting assembly of claim 4, wherein:

the lip has a curved outer peripheral surface which extends from an outer edge of said shoulder surface.

6. The sensor mounting assembly of claim 1, wherein:

the sensor body has a plurality of axially extending ridges formed on an outer surface thereof and separated by spaces; and the fingers being received by the spaces between the ridges.

7. The sensor mounting assembly of claim 1, wherein:

the sensor body has a plurality of axially extending ridges formed on an outer surface thereof and separated by spaces;

the fingers being received by the spaces between the ridges; and the sensor teeth being formed on a surface of the sensor body in the spaces between the ridges.

8. The sensor mounting assembly of claim 1, wherein the retainer comprises:

a C-shaped body part, an alignment tab extending axially from a central portion of the body part, a first set of fingers extending axially away from the body part on one side of the central portion, and a second set of fingers extending axially away from the body part on another side of the central portion.

9. The sensor mounting assembly of claim 8, wherein:

a first lip segment is formed on the body part adjacent to the first set of fingers; and a second lip segment is formed on the body part adjacent to the second set of fingers.

10. The sensor mounting assembly of claim 8, wherein:

an arm projects radially outwardly from the alignment tab;

an locating pin projects axially away from an end of the arm; and the housing includes an alignment bore spaced apart from the sensor bore for receiving the alignment pin.

* * * * *